May 15, 1962  E. W. SWEZEY ET AL  3,034,637
CONVEYOR
Original Filed June 9, 1955  5 Sheets-Sheet 1
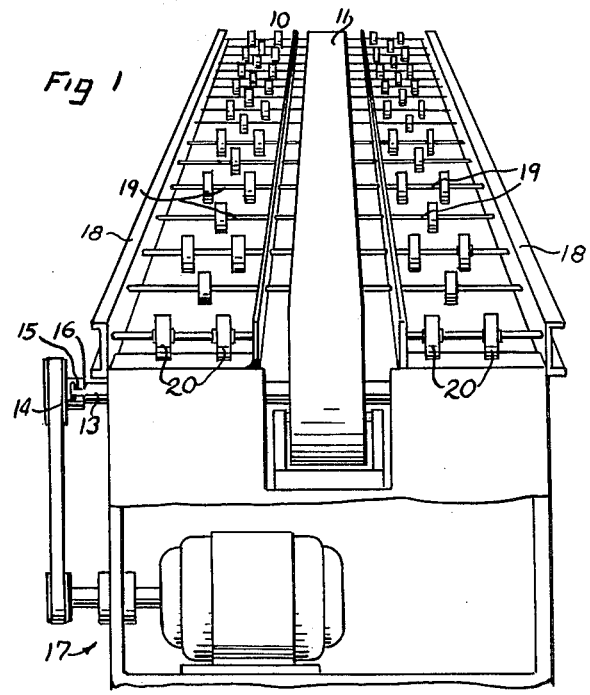
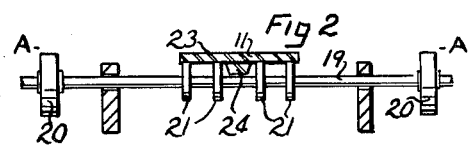
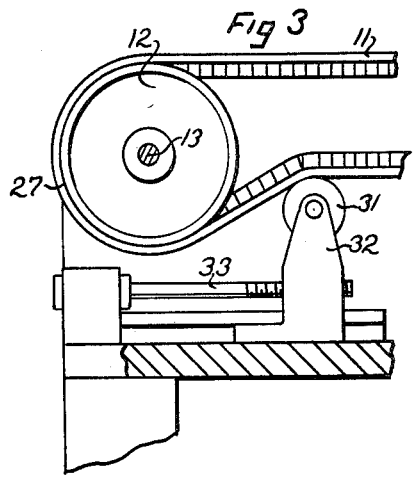
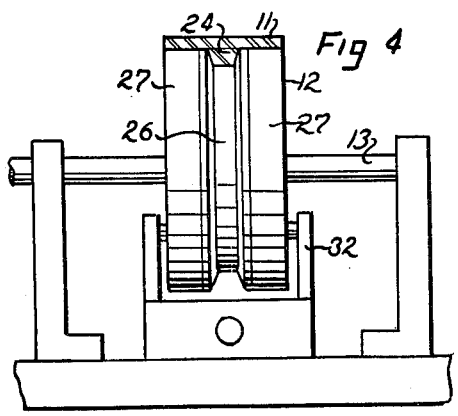
INVENTORS
Robert J. McKnight
Edwin W. Swezey

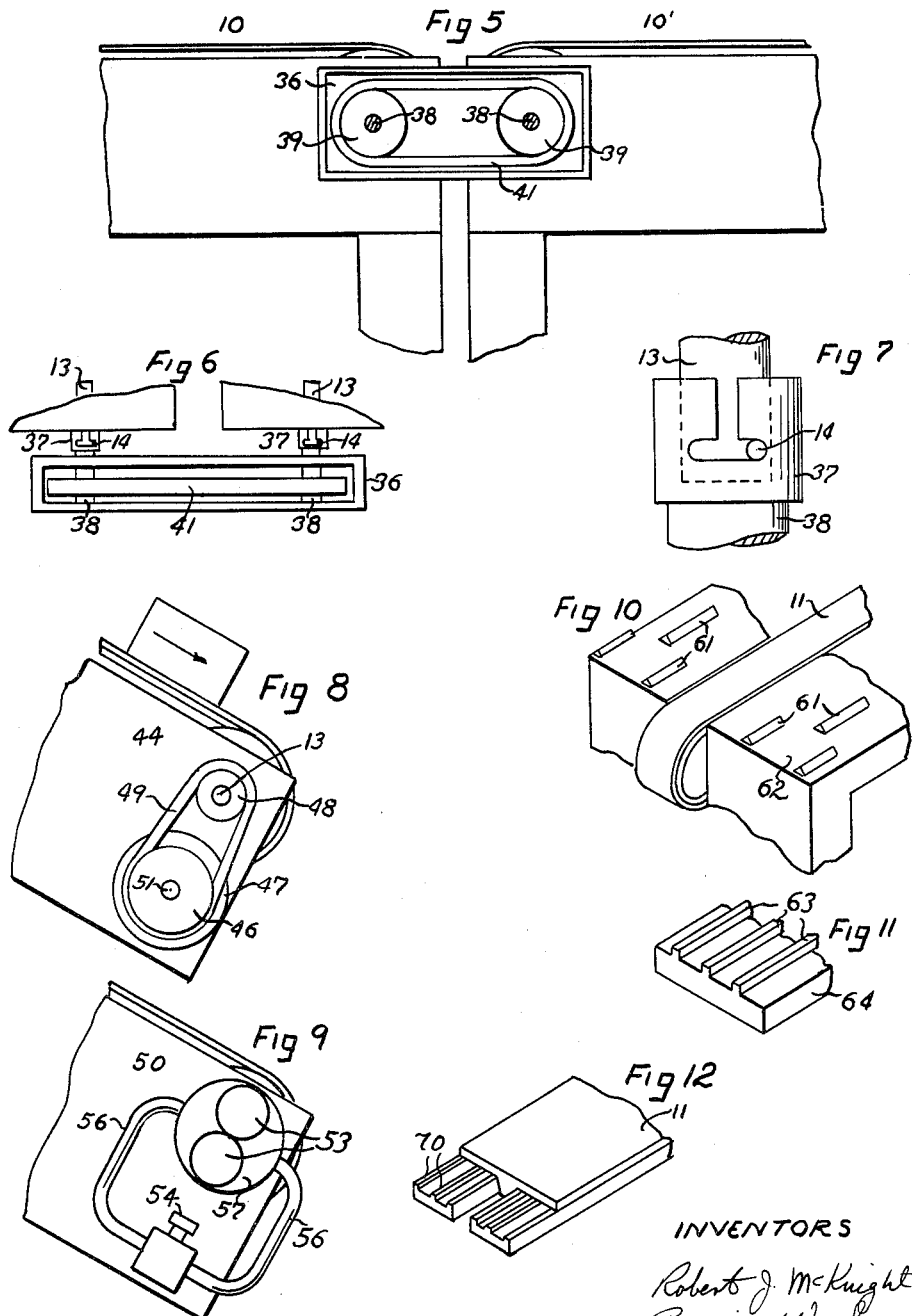

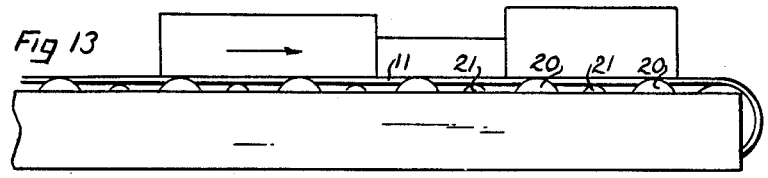
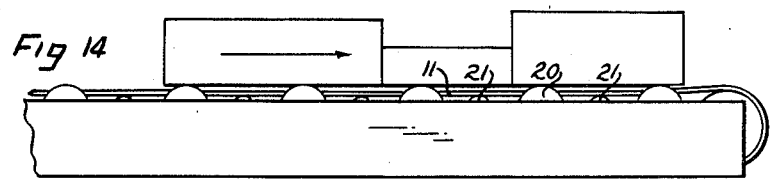
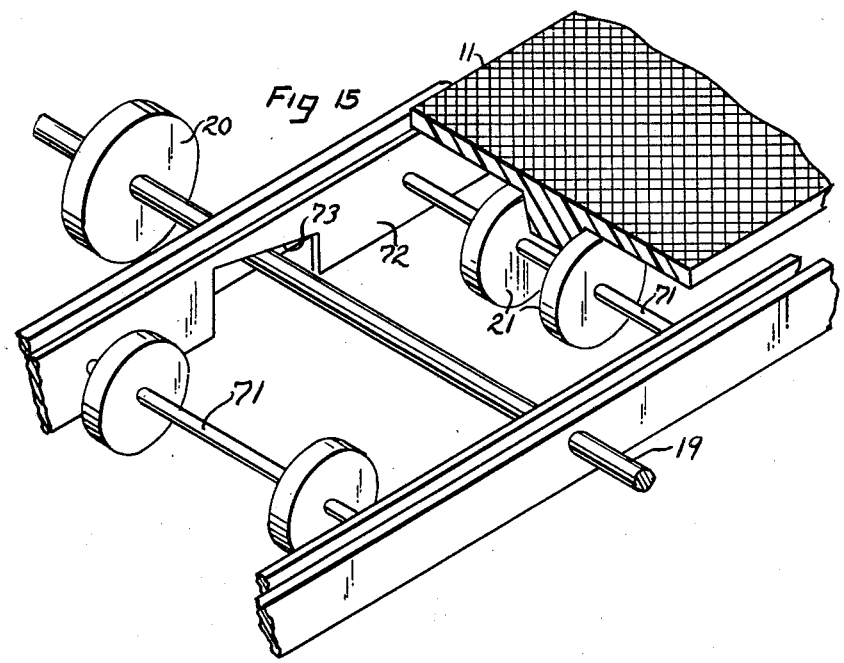

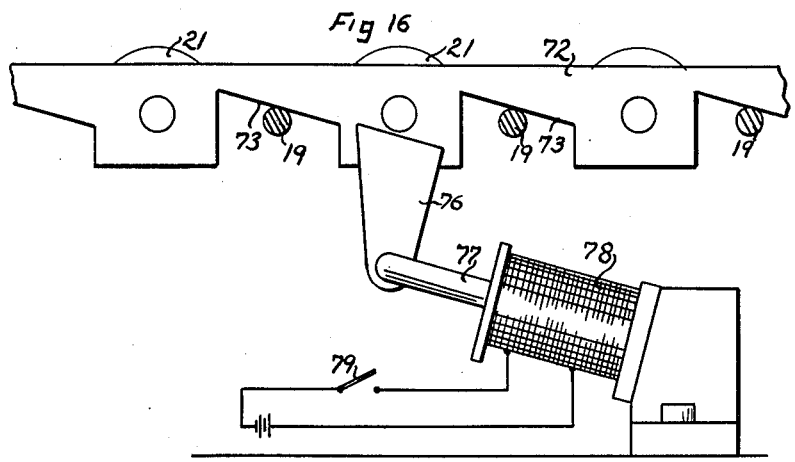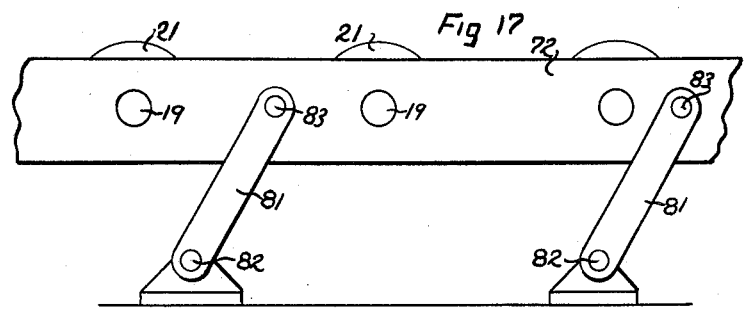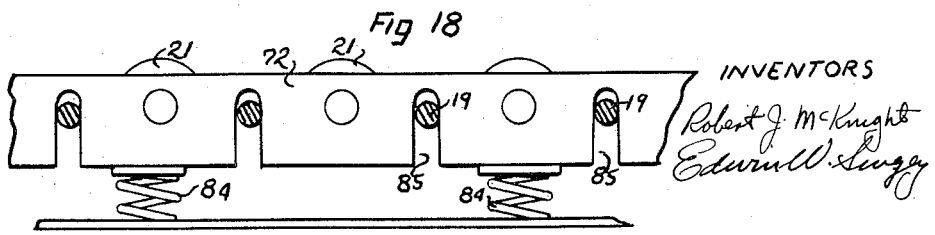

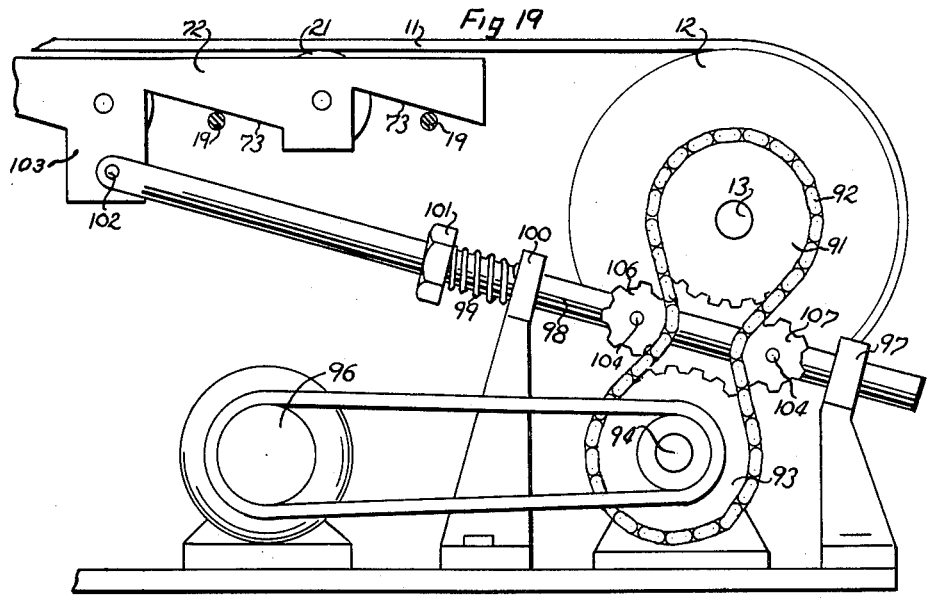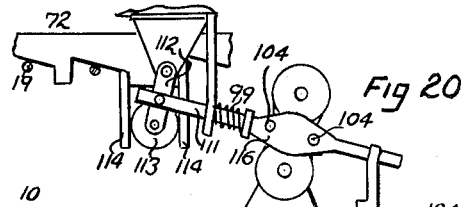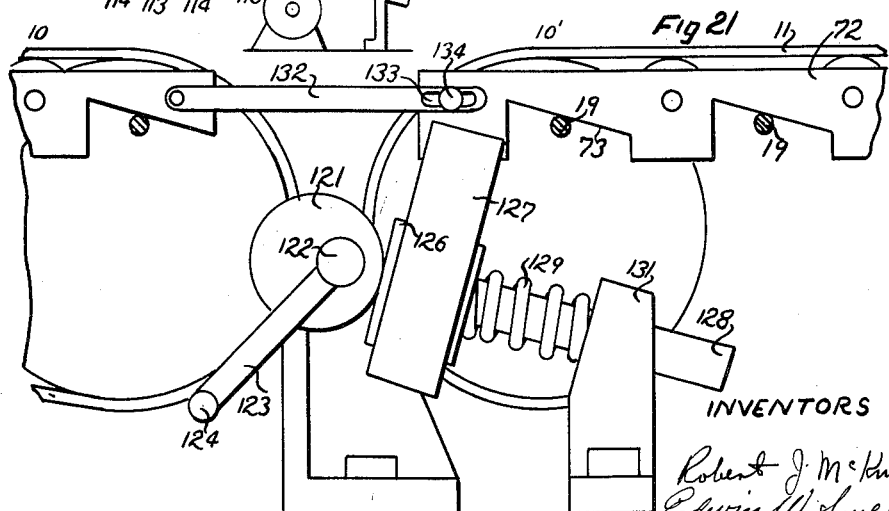

United States Patent Office 3,034,637
Patented May 15, 1962

3,034,637
CONVEYOR
Edwin W. Swezey, Hackensack, and Robert J. McKnight, Upper Montclair, N.J., assignors to The Rapids-Standard Company, Inc., Grand Rapids, Mich., a corporation of Michigan
Original application June 9, 1955, Ser. No. 514,288, now Patent No. 2,895,593, dated July 21, 1959. Divided and this application Mar. 17, 1959, Ser. No. 800,053
5 Claims. (Cl. 198—160)

This invention relates to conveyors and especially conveyors of the type using a belt.

This application is a division of United States patent application Serial No. 514,228, now Patent No. 2,895,593, filed June 9, 1955, entitled "Conveyors."

An important object of the present invention is the provision of a conveyor construction using a belt with anti-friction surfaces provided preferably at both sides of the belt so that an article to be conveyed may rest partially on the belt and partially on the anti-friction surfaces.

Another object of the invention is the provision of a conveyor using a relatively narrow endless belt having disposed at opposite sides thereof a series of rollers which may be mounted on anti-friction bearings.

A further object of the invention is the provision of a conveyor using a relatively narrow endless belt having disposed at opposite sides thereof fixed anti-friction surfaces.

Another very important object of the invention is the provision of means to adjust the position of the belt with respect to the anti-friction surfaces at either side thereof and to control the gripping action of the belt on the article to be conveyed. Such adjustment and control may be accomplished manually or automatically, and it is within the contemplation of the invention to use mechanical or electrical means or a combination of both to accomplish such adjustment. It is, of course, possible to adjust the belt to such a position that an article to be conveyed is at rest and supported solely by the anti-friction means at either side of the belt or to vary the gripping contact of the belt with the article as desired.

A feature of the invention is the use of a flat belt having a substantially wedge-shaped depending portion for engaging the groove of the pulleys used for rotating and guiding the belt. The pulley itself is of special construction and features wide flanges extending outwardly at opposite sides of the grooved portion of the pulley to insure adequate support for the belt.

A further feature of the invention is the flexibility of use of the conveyor unit which may be attached to a like conveyor unit, or even to a conveyor unit of a different type.

An additional feature is that the conveyor unit may be driven by a detachable motor coupling unit and, in order to connect conveyor units in tandem, tail and head pulley shafts respectively of adjoining conveyors may be coupled together by a detachable coupling unit.

The conveyor unit of the present invention may even find utility as a gravity conveyor by detaching the motor unit and, if desirable, connecting to the appropriate pulley shaft of the conveyor a regulatable braking means which is preferably of the fluid type.

Besides its great flexibility of use, a conveyor embodying the present invention may be relatively light in weight, since it makes possible the use of a narrow belt in combination with the anti-friction surfaces which permit free sliding movement of an article to be conveyed which extends beyond the edges of the belt. A disadvantage of prior art belt conveyors is that there are no open portions in the conveyor through which switching members or other mechanical accessories may be inserted. This disadvantage is obviated in the present invention since the belt occupies only a relatively small portion of the upper part of the conveyor leaving ample open spaces at either side of the belt due to the use of spaced anti-friction surfaces.

Yet another advantage of the present invention is that, since there is adequate open space at either side of the belt, a carton or other article may be readily handled by an operator who may place his fingers below such a carton without first tilting the carton, which is rather difficult with a wide belt which does not leave exposed any part of the underportion of the article. This is also a safety factor.

One exemplary situation in which the automatic adjustment of the belt finds utility is a conveyor system using a plurality of conveyor units in tandem. As sometimes occurs, an article in advance of the conveyor unit being considered is stopped so that a series of articles pile up at the rear of said article and exert great pressure. By means of the automatic adjustment of the present invention it is possible to reduce the forward thrust on the piled up articles, or even to stop the thrust entirely by lowering the belt sufficiently, as above indicated. Such a measure precludes the possibility that articles or cartons being conveyed will buckle under the large forward thrust which could otherwise be built up during a stoppage condition.

Other objects, features and advantages of the instant invention will appear to those conversant with the conveyor art from a perusal of the following detailed description and the accompanying drawings.

FIG. 1 is an end perspective view of the conveyor.

FIG. 2 is a detailed view illustrating a belt in combination with roller wheels beneath and at opposite sides of the belt.

FIG. 3 is a detailed view of means for adjusting the belt tension.

FIG. 4 is an end view of a pulley showing the belt in engagement therewith.

FIGS. 5, 6 and 7 are schematic illustrations of a detachable coupling for coupling together two conveyor units, FIG. 5 being a side view, FIG. 6 being a top view, and FIG. 7 being a detailed view of the coupling proper.

FIG. 8 illustrates a fluid drive braking arrangement for a gravity conveyor.

FIG. 9 illustrates a fluid pump braking arrangement for gravity conveyor.

FIG. 10 is a partial perspective view showing a belt in combination with fixed anti-friction surfaces at opposite sides of the belt.

FIG. 11 is a partial perspective view showing the use of continuous anti-friction ribs or rails.

FIG. 12 is a partial perspective view showing fixed anti-friction surfaces for supporting and guiding the belt.

FIG. 13 illustrates a conveyor unit having an adjustable belt with the belt adjusted to a raised position.

FIG. 14 illustrates a conveyor unit having an adjustable belt with the belt adjusted to a lowered position.

FIG. 15 is a partial perspective view ilustrating particularly the center frame used for raising and lowering the belt.

FIGS. 16, 17 and 18 are detailed views showing arrangements for moving the center frame.

FIGS. 19 and 20 are detailed views showing arrangements for automatically adjusting the position of the belt; and FIG. 21 is a detailed view showing an arrangement for manually adjusting the position of the belt.

With reference first to FIGS. 1 to 4, the conveyor unit 10 is shown employing a relatively narrow belt 11 which is mounted on pulleys 12 at opposite ends of the conveyor unit. The pulleys 12 are attached to shafts 13 suitably journalled in the apparatus. The shaft 13 used as the driving shaft has projecting upwardly therefrom toward one end a pin 14, better seen in FIG. 7, so that when the portion of the slotted opening 15 of the coupling collar 16 of a detachable motor unit 17 extending to the right in FIG. 1 is in alignment with the pin by sliding the motor unit to the right, driving engagement will be effected when the motor rotates to lock the pin in the portion of the coupling extending transverse to the axis of shaft 13.

Attached to the conveyor frame 18, which may be of aluminum or other light weight material, is a series of shafts 19 extending transverse to the direction of travel and supporting at opposite sides of the belt the rollers 20 and beneath the belt rollers 21 of lesser diameter than the rollers 20 whereby the outer surface 23 of the belt is substantially in the plane A of the upper surface of the rollers 20.

By particular reference to FIG. 2 and 4, it will be observed that the belt includes a wedge-shaped depending portion 24 in engagement with the groove 26 of pulley 12 and further that the pulley includes flanges 27 which provide adequate support for the belt. The rollers 21 closest to the central portion of the belt are preferably placed at opposite sides and contiguous with the depending portion 24 of the belt to assist in guiding the belt along its course in addition to providing support for the belt. The rollers 20 and 21 are preferably of the type having anti-friction bearings, sometimes referred to as skate wheels.

It may also be desirable to mount the rollers 20 which are at opposite sides and closest to the edges of the belt somewhat remote from said edges so that an article to be conveyed may tend to bow in at the center, thus insuring an adequate gripping contact of the article with the upper surface 23 of the belt. Additionally, if there is some wear on the upper surface of the belt, gripping engagement will still be assured. The rollers 20 may comprise only a single roller on each shaft 19 at opposite sides of the belt or there may be two or more rollers mounted at each side of the belt. In FIG. 1 the rollers are shown mounted in staggered formation with two rollers 20 mounted on alternate shafts and only a single roller 20 on the intervening shafts 19 considering, of course, only one side of the belt. It is also feasible to use only a single roller 21 below the belt 11 on either side thereof, or to arrange these rollers in any convenient pattern.

It is apparent from the aforementioned description that an article to be conveyed may be placed on the conveyor with the central portion of its lower surface in driving engagement with gripping surface 23 of the belt 11 and with its outer portion of its lower surface resting on the rollers 20. When the motor is operated, the belt will transport the article while outer portions of the lower surface of the articles will engage the rollers 20 at spaced points and ride freely thereover, the rollers adding a minimum to the total load and usually less than that contributed by the prior art wide and heavy belt underlying substantially the entire surface of the article to be conveyed.

It might be mentioned here that it is conventional prior art practice in the usual wide belt conveyor to place rollers beneath the belt to insure that support is provided at all points beneath the belt so that rollers equivalent to rollers 21 are already present in such arrangements. In other words, the rollers 20 are not necessarily additional items of the conveyor but items normally present in belt conveyors.

In FIG. 3 is shown an arrangement for adjusting the belt tension comprising an idler roller 31 journalled on bracket 32 which has threaded therein a driving screw 33 which may be suitably rotated to vary the position of bracket 32 which is mounted for sliding movement to thus vary the tension on the belt 11 as desired.

In FIGS. 5, 6, and 7 is shown a detachable coupling 36 whereby two conveyor units 10 and 10′ may be connected together in tandem in driving engagement. The same type of bayonet coupling described earlier for the detachable motor unit may be utilized comprising the bayonet coupling collars 37 projecting from the detachable coupling and respectively suitably attached to shafts 38. The shafts carry the sprockets 39 in engagement with the chair schematically shown at 41. It is obvious, especially from the previous description of the motor unit, that the coupler 36 may be placed in driving engagement with shafts 13 of separate conveyor units by moving the collars 37 over said shafts to engage the pins 14 on the shafts, rotation of the shafts locking the pin in the slotted portion of the bayonet coupling which is normal to the axis of shafts 38. The central opening of the collars 37 are, of course, appropriately machined to insure a snug fit of the collars on the shafts 13.

If it is desired that the conveyor be utilized for conveying via gravity, the motor unit 17 may be withdrawn and there may be connected in driving engagement with one of the shafts 13 a fluid braking device 44 shown schematically in FIG. 8, which may be suitably adjusted in any conventional manner such as by varying the relative axial positions of the rotor 46 and stator 47, or by angular adjustment of the blades in the rotor or stator. Thus, as an article descends, it will cause the belt to move in its endless path rotating the pulley 48 on shaft 13 to drive the belt 49 to rotate the rotor 46 and shaft 51 against the retarding action of the fluid between the rotor 46 and stator 47.

A similar result may be accomplished by use of the fluid pump 50 according to FIG. 9 by coupling one of the impellers 53 to a pulley shaft 13 and adjusting the valve 54 controlling the fluid proceeding over one conduit 56 to the housing 57 where it is pumped in a circuitous course over the other conduit 56, and back through valve 54. It is obvious that, by adjusting the constriction of the valve opening, the retarding action of the fluid pump may be adjusted.

Turning now to FIG. 10, it will be seen that, for the wheels 20 of FIGS. 1 and 2, may be substituted at either side of the belt a series of fixed anti-friction projections 61 suitably mounted at the top portion 62 of the conveyor.

In the place of the projections 61 may be substituted the rib or rail members 63 projecting upwardly from a member 64 as shown in FIG. 11. These ribs or rail members 64 may extend at either side and along substantially the entire length of the upper pass of the belt.

In place of rollers 21 there may be used below belt 11, as shown in FIG. 12, a series of anti-friction ribs or rails which may be continuous or arranged in any convenient pattern.

Now to be described is the embodiments of the invention devoted to varying the gripping action of the belt in proportion to the load or the position of the belt with respect to the plane of the anti-friction surfaces at either side of the belt. In FIG. 13, the belt is shown in a raised position in gripping engagement with the cartons to be conveyed, whereas in FIG. 14 the belt is shown in a lowered position out of engagement with the cartons. In FIG. 14, therefore, the gripping engagement has been reduced to zero.

The belt 11 shown in FIG. 15, which also brings out that the surface thereof may have excellent gripping qualities, is supported during the upper pass once more by rollers 21 but in the present case the rollers 21 are no longer mounted on the shaft 19 carrying the larger outer rollers 20, but instead, are mounted on shafts 71 carried by a separate movable center frame 72. The center frame is mounted on the central portion of the shafts 19 with the sloping cam surfaces 73 at opposite sides of the frame resting on the shafts and free to move thereon so that when the center frame 72 is shifted to the right as viewed in FIG. 15, the center frame will be lowered, whereby the rollers 21 will exert less pressure beneath the under portion of belt 11, and the belt in turn tends to exert less gripping action on the article to be conveyed. Ultimately, of course, further movement to the right will lower the belt to such position that it no longer engages the article to be conveyed. When the center frame is shifted to the left, the opposite condition ensues—the center frame moving upwardly and pressing the rollers more firmly against the under portion of belt 11 and increasing the gripping action of the belt on the article to be conveyed as the rollers are raised. The position of the frame 72, and hence the gripping engagement of the belt 11, may be controlled as described hereafter in connection with FIG. 21.

FIG. 16 shows one arrangement for controlling the position of the belt or gripping action thereof wherein there is attached to the center frame a depending member 76 in operative engagement with the armature 77 of solenoid 78. The solenoid 78 may be actuated by means of switch 79 which may be controlled manually or by a relay and may even form part of a remote control system or a system using automation. There may be an additional depending member like 76 at the opposite side of the center frame 72, the depending members being interconnected by means of a plate, or otherwise.

In FIG. 17 the cam surfaces 73 may be dispensed with, the movement of the frame being controlled by levers 81 suitably pivoted at 82 and 83. Of course, there may be a further set of levers 82 (not shown) mounted at the other side of the center frame 72. It is understood that any suitable mechanism may be attached to the center frame 72 or the levers 81 to move the center frame together with rollers 21 to the desired position beneath the belt.

A further mounting for the center frame 72 is shown in FIG. 16 where again the cam surfaces 73 are dispensed with. In this case, the opposite sides of the center frame includes slotted portions 85 in engagement with the shafts 19. Compression spring members 84 which also may, if desired, be placed at opposite sides of the center frame 72 urge the center frame in an upward direction. The compression springs 84 may be so selected and suitably adjusted to exert the desired upwardly acting force on the center frame so that the forward thrust on the article to be conveyed is controlled.

FIGS. 19 and 20 show arrangements automatically operative to adjust the position of the belt 11. In FIG. 19 the belt 11 is driven by the pulley 12 mounted on shaft 13. Also, attached to the shaft 13 is the sprocket 91 in driving engagement with the chair 92 which passes also around the sprocket 93 mounted on shaft 94 driven by the motor 96. Mounted on fixed sleeves 97 and 100 of the conveyor unit is a rod 98. The rod 98 is surrounded at one portion thereof by a spring 99 which presses against the sleeve 100 under the action of the adjustable nut 101.

The rod 98 is attached at 102 to the depending portion 103 of the center frame 72. Attached to the rod 98 are a pair of spaced shafts 104 carrying the sprockets 106 and 107 which are in engagement with the chain 92, as shown in FIG. 19. When the load on the belt 11 increases, the chain portion at the right as seen in FIG. 19 tends to straighten out, pushing against the sprocket 107 and thereby moving the rod 98 to the right against the influence of spring 99. This, of course, moves the center frame 72 to the right so that the pressure of rollers 21 against the under portion of the belt 11 is lessened. The mechanism may operate in the reverse manner when a decreased load condition is encountered.

FIG. 20 is very similar to FIG. 19 except that now, instead of the rod 98, there is provided a rod 111 attached to a lever 112 carrying anti-friction wheels 113, only one of which is shown, which bear against plates 114 depending from center frame 72. Further in the figure the sprockets 106 and 107 (not shown) are mounted between plates 116, only one of which is shown.

It is possible to arrange the movement of the center frame so that under very abnormal conditions of load the position of the wheels 21 may be lowered to such an extent that the article to be conveyed rests solely on the outer rollers 20, which means that the belt is actually placed out of driving engagement with the article. There may be provided a limit switch engageable by any movable part associated with the movement of the belt when a particular position is reached, to control or operate the motor.

It has been found that, after compensation for a load change has been made, the center frame tends to hold the adjusted position. It will be noted that, since sprockets 106 and 107 are both mounted on the rod (FIG. 19), movement of sprocket 107 will be accompanied by a like movement of sprocket 106 which will maintain its driving engagement with the chain 92. As pointed out heretofore, the adjustable nut 101 may be used to adjust the tension of the spring 99, whereby the shaft will move when a predetermined load is applied to the belt.

FIG. 21 illustrates how the position of the belt 11 or the gripping action of the belt may be varied not only in one conveyor unit 10 but also in an adjoining conveyor unit. In this case, an eccentric 121 is mounted on a suitably supported shaft 122 which carries a handle 123 having a hand gripping portion 124. As the handle is moved clockwise in FIG. 21, the eccentric moves against plate 126 attached to member 127 which may be suitably fastened to center frame 72. As the plate 126 moves, it carries with it the rod 128 against the action of compression spring 129, the rod 128 being suitably mounted for sliding movement in sleeve 131.

The center frame 72 of conveyor unit 10 is simultaneously movable with the center frame 72 of adjoining conveyor unit 10' by reason of the link connection which includes a slotted portion 133 wherein adjustment may be made by means of the screw 134. Center frames 72 of adjoining sections may also be adjusted to different elevations, if desired. Also, frame 72 may be so constructed that one end is at a slightly higher elevation than the other end, with respect to wheels 20.

Shaft 122 may, of course, include a ratchet with a cooperating detent so that the shaft may be held in an adjusted intermediate position, if desired.

While the use of a single belt has been shown, it is obvious that a plurality of belts may be used. For example, a pair of spaced belts could be used with anti-friction surfaces mounted intermediate the belts, and if desired, additional anti-friction surfaces may be mounted at the outside of the respective belts.

It may be desirable in some cases to use a belt having a plurality of depending portions to engage respective grooves of a multi-grooved pulley.

The belt may be between twenty and thrity percent of the overall width of the conveyor. For example, a 4-inch belt has been found to work well with an 18-inch wide conveyor.

The belt may be constructed of a multi-ply canvas with a ribbed or embossed surface of rubber for good gripping action, or if desired for some applications, a smooth surface.

Various departures may be made in the embodiments shown without departing from the spirit of the invention.

We claim:

1. A conveyor for conveying articles in a substantially straight path and including a conveyor frame, head and tail pulleys mounted on said frame and having substantially horizontal axes laterally of said frame, a flexible endless belt interengaging said head and tail pulleys thus providing top and bottom passes extending along the length of said frame, said belt having an inner peripheral rib re-entrantly on said pulleys to arrest lateral slip of the belt and a frictional gripping face at the outer periphery, said frictional gripping face in the top pass having its width dimension laterally of said conveyor frame, a plurality of article conveying rollers on said conveyor frame on opposite sides of the top pass of said belt and spaced repeatedly along substantially the full length of said top pass, said rollers having their uppermost surfaces situated in a conveying plane and thus affording an article conveying path along the length of said conveyor frame, support means including a vertically movable frame on said conveyor frame, said vertically movable frame having inclined surfaces riding on fixed members of the conveyor frame to raise and lower said support means under the bottom of the top pass of said belt as the movable frame is shifted horizontally; a plurality of spaced parallel shafts on said vertically movable frame and extending laterally of the belt underneath said top pass, rotary anti-friction components on each of said shafts on the vertically movable frame, said components contacting the underneath surface of the top pass of said belt on opposite sides of the rib on the inner peripheral surface of said belt and being movable with said vertically movable frame to being said frictional gripping face into frictional driving position with respect to the bottom of an article resting on said article conveying rollers.

2. A conveyor for conveying articles in a substantially straight path and including a conveyor frame, a flexible endless belt having top and bottom passes extending along the length of said frame, said belt having a frictional gripping face at the outer periphery, said frictional gripping face in the top pass having its width dimension laterally of said conveyor frame, a plurality of article conveying rollers on said conveyor frame on opposite sides of the top pass of said belt and spaced repeatedly along substantially the full length of said top pass, said rollers having their uppermost surfaces situated in a conveying plane and thus affording an article conveying path along the length of said conveyor frame, support means including a vertically movable frame on said conveyor frame, said vertically movable frame having inclined surfaces riding on fixed members of the conveyor frame to raise and lower said support means under the bottom of the top pass of said belt as the movable frame is shifted horizontally; a plurality of spaced parallel shafts on said vertically movable frame and extending laterally of the belt underneath said top pass, rotary anti-friction components on each of said shafts on the vertically movable frame, said components contacting the underneath surface of the top pass of said belt and being movable with said vertically movable frame to bring said frictional gripping face into frictional driving position with respect to the bottom of an article resting on said article conveying rollers.

3. A conveyor for conveying articles in a substantially straight path and comprising a conveyor frame, a flexible endless belt extending along the length of said frame, said belt having an upper frictional gripping face at the outer periphery, a plurality of article conveying rollers on said conveyor frame on opposite sides of said belt and spaced repeatedly along substantially the full length of said frame, said rollers having their uppermost surfaces situated in a conveying plane and thus affording an article conveying path along the length of said conveyor frame said conveyor having fixed members, support means having a vertically movable frame, said vertically movable frame having inclined surfaces riding on said fixed members of the conveyor frame to raise and lower said support means beneath said belt as the movable frame is shifted horizontally; a plurality of spaced parallel shafts on said vertically movable frame and extending laterally of the belt, rotary anti-friction components on each of said shafts on the vertically movable frame, said components contacting the underneath surface of said belt and being movable with said vertically movable frame to bring said frictional gripping face into frictional driving position with respect to the bottom of an article resting on said article conveying rollers.

4. A conveyor for conveying articles in a substantially straight path and comprising a conveyor frame having fixed members, a flexible endless propelling member extending along the length of said frame, said propelling member having a frictional gripping surface, a plurality of article conveying rollers on said conveyor frame on opposite sides of said propelling member and spaced repeatedly along substantially the full length of said frame, said rollers having their uppermost surfaces situated in a conveying plane and thus affording an article conveying path along the length of said conveyor frame, support means having a vertically movable frame, said vertically movable frame having inclined surfaces riding on said fixed members to raise and lower said support means beneath said propelling member as the movable frame is shifted horizontally; a plurality of spaced parallel shafts on said vertically movable frame and extending laterally of the propelling member, rotary anti-friction components on each of said shafts on the vertically movable frame, said components contacting the underneath surface of siad propelling member and being movable with said vertically movable frame to bring said frictional gripping surface into frictional driving position with respect to the bottom of an article resting on said article conveying rollers.

5. A conveyor for conveying articles in a substantially straight path and comprising a conveyor frame having fixed members, a flexible endless propelling member extending along the length of said frame, said propelling member having a frictional gripping surface, a plurality of article conveying rollers on said conveyor frame on opposite sides of said propelling member and spaced repeatedly along substantially the full length of said frame, said rollers having their uppermost surfaces situated in a conveying plane and thus affording an article conveying path along the length of said conveyor frame, support means having a vertically movable frame, said vertically movable frame having inclined surfaces riding on said fixed members to raise and lower said support means beneath said propelling member as the movable frame is shifted horizontally; anti-friction components mounted on said vertically movable frame, said components contacting the underneath surface of said propelling member and being movable with said vertically movable frame to bring said frictional gripping surface into frictional driving position with respect to the bottom of an article resting on said article conveying rollers.

References Cited in the file of this patent

UNITED STATES PATENTS

| | | |
|---|---|---|
| 521,647 | Edwards | June 19, 1894 |
| 1,209,021 | Phillips | Dec. 19, 1916 |
| 1,857,566 | Perry | May 10, 1932 |
| 2,021,503 | Fildes | Nov. 19, 1935 |
| 2,410,611 | Pratt et al. | Nov. 5, 1946 |

FOREIGN PATENTS

| | | |
|---|---|---|
| 6,806 | Great Britain | May 12, 1900 |